United States Patent
Dung-Lung

(10) Patent No.: US 6,392,321 B1
(45) Date of Patent: May 21, 2002

(54) ROTARY DEVICE EMPLOYING MAGNETIC FORCE

(76) Inventor: Ma Dung-Lung, 11 F-2 No. 43, Chai-I Street, Taichung City (TW)

( * ) Notice: Subject to any disclaimer, the term of this patent is extended or adjusted under 35 U.S.C. 154(b) by 0 days.

(21) Appl. No.: 09/768,578

(22) Filed: Jan. 25, 2001

(51) Int. Cl.$^7$ ................................................ H02K 7/10
(52) U.S. Cl. ........................ 310/75 R; 310/92; 310/74; 310/121
(58) Field of Search ................................. 310/75 R, 74, 310/96, 92, 91, 118, 121

(56) References Cited

U.S. PATENT DOCUMENTS

| | | | | |
|---|---|---|---|---|
| 3,567,977 A | * | 3/1971 | McLean | 310/111 |
| 3,942,051 A | * | 3/1976 | Stevinson et al. | 310/15 |
| 4,385,246 A | * | 5/1983 | Schur et al. | 310/10 |
| 5,925,958 A | * | 7/1999 | Pirc | 310/152 |
| 6,249,070 B1 | * | 6/2001 | Sharp | 310/90.5 |
| 6,331,744 B1 | * | 12/2001 | Chen et al. | 310/171 |

* cited by examiner

*Primary Examiner*—Nestor Ramirez
*Assistant Examiner*—Thanh Lam
(74) *Attorney, Agent, or Firm*—Charles E. Baxley

(57) ABSTRACT

A rotary device includes an output shaft securely connected to a sandwiched structure including a central magnetic permeable member and two outer magnetic un-permeable members. The sandwiched structure is enclosed by a ring composed of a plurality of sections assembled by the sandwiched structure. Each section has another sandwiched structure which is rotated by a cam member mounted on the output shaft by links. The output shaft is rotated by an initial force and will be rotated by the magnetic force by the inter-action between these sandwiched structures without extra force applied on the output shaft.

4 Claims, 9 Drawing Sheets

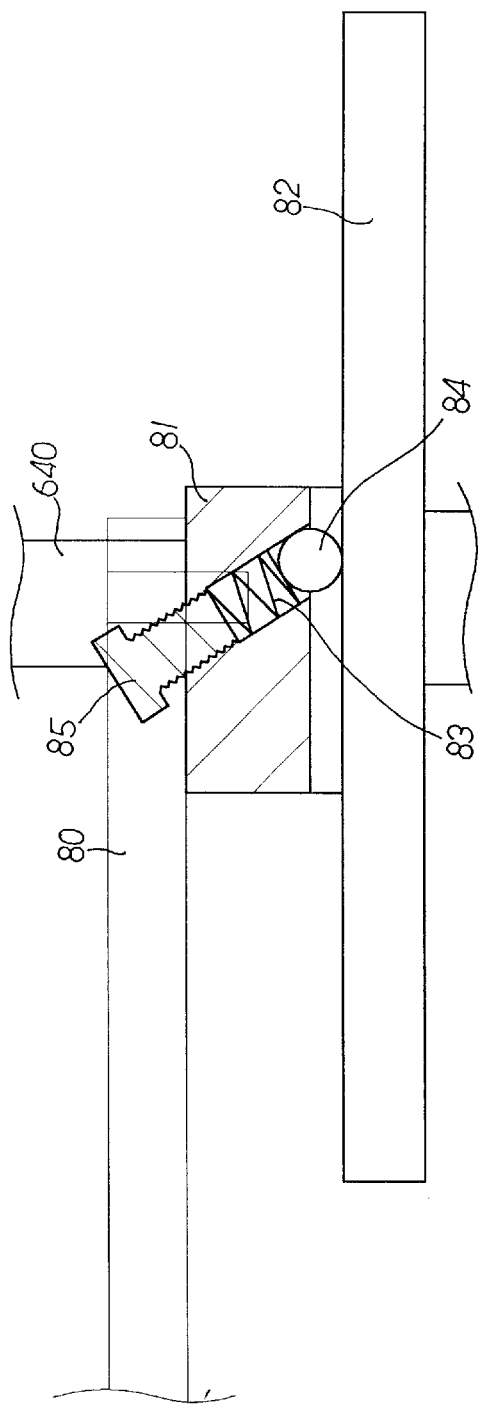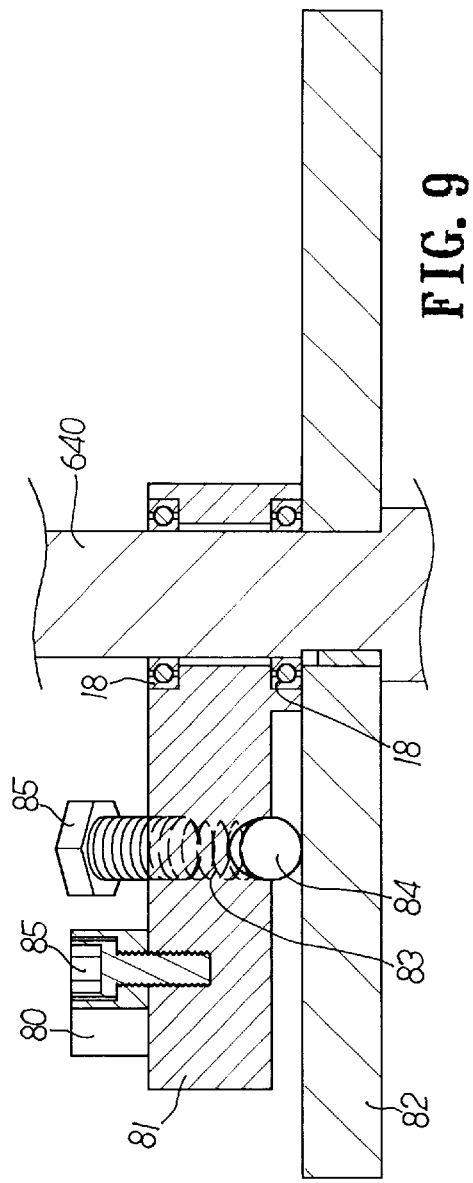

US 6,392,321 B1

ROTARY DEVICE EMPLOYING MAGNETIC FORCE

FIELD OF THE INVENTION

The present invention relates to a rotary device which is rotated by using magnetic force and the rotary shaft of the device continuously rotates without need of extra force.

BACKGROUND OF THE INVENTION

A conventional energy output device, such as an electricity power generating device, uses a certain type of fuel such as gas to rotate a part in the device to generate the electricity. However, all the types of the fuels will cause more or less pollution to the environment. It is the price for the rotation of the part of the device. In other words, people use one type of energy to transfer it into the other type of energy, and during the process to make the rotation of the part in the device, the fuel has to be continuously added to maintain a power to rotate the part. The fuel is running out at a speed on the earth and it is necessary to develop a new way to generate the energy we need.

The present invention intends to provide a device that uses magnetic force to continuously rotate the output shaft with an initial force and the rotation of the output shaft provides the energy we need.

SUMMARY OF THE INVENTION

In accordance with one aspect of the present invention, there is provided a rotary device by using magnetic force and comprising a rotator composed of a first member made of magnetic permeable material and two second members made of magnetic un-permeable material. An output shaft securely extends through the first member which is clamped between the two second members. The output shaft has bevel teeth. The rotator is enclosed by a ring composed of multiple sets of sections, each section has a cylindrical assembly rotatably retained between two side members made of magnetic permeable material. Two mediate members made of magnetic un-permeable material are clamped between the two side members. Each cylindrical assembly comprises a center member made of magnetic permeable material and sandwiched by two outer member made of magnetic un-permeable material. A rod extends through the center member of each cylindrical assembly. A first end of the rod has a crank.

A first fixed disk has a hole for the output shaft extending therethrough and a plurality of first passages are defined radially in the first fixed disk. An activation disk has a passage which has a bevel teeth inner periphery which is engaged with the bevel teeth of the output shaft. A path is defined in a surface of the activation disk. A plurality of first links movably extend through the first passages and a pin is connected to each of the first links. The pins are movably engaged with the path in the activation disk. Each of the first link is pivotally connected a second link which is connected to one of the cranks.

A second fixed disk is mounted to the output shaft on the other side of the rotator. A plurality of second passages are defined radially in the second fixed disk and each second passage has a push rod movably inserted therethrough. A cam member is mounted to the output shaft so as to push a first end of each of the push rods. A second end of each push rods is connected to an end of a block and the other end of the block is pivotally connected to a second end of one of the rods.

The primary object of the present invention is to provide a rotary device wherein the output shaft continuously rotates with only an initial force applied to the output shaft. The output shaft is driven by magnetic force caused by the opposite against force between different magnetic polarities.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 9 is a cross sectional view to show each block has a ball biased by a spring and the ball contacts a plate when the block is rotated about the rod, and FIG. 10 is a cross sectional view to show another situation of the relationship between block and the plate.

DETAILED DESCRIPTION OF THE PREFERRED EMBODIMENT

Figure 1:
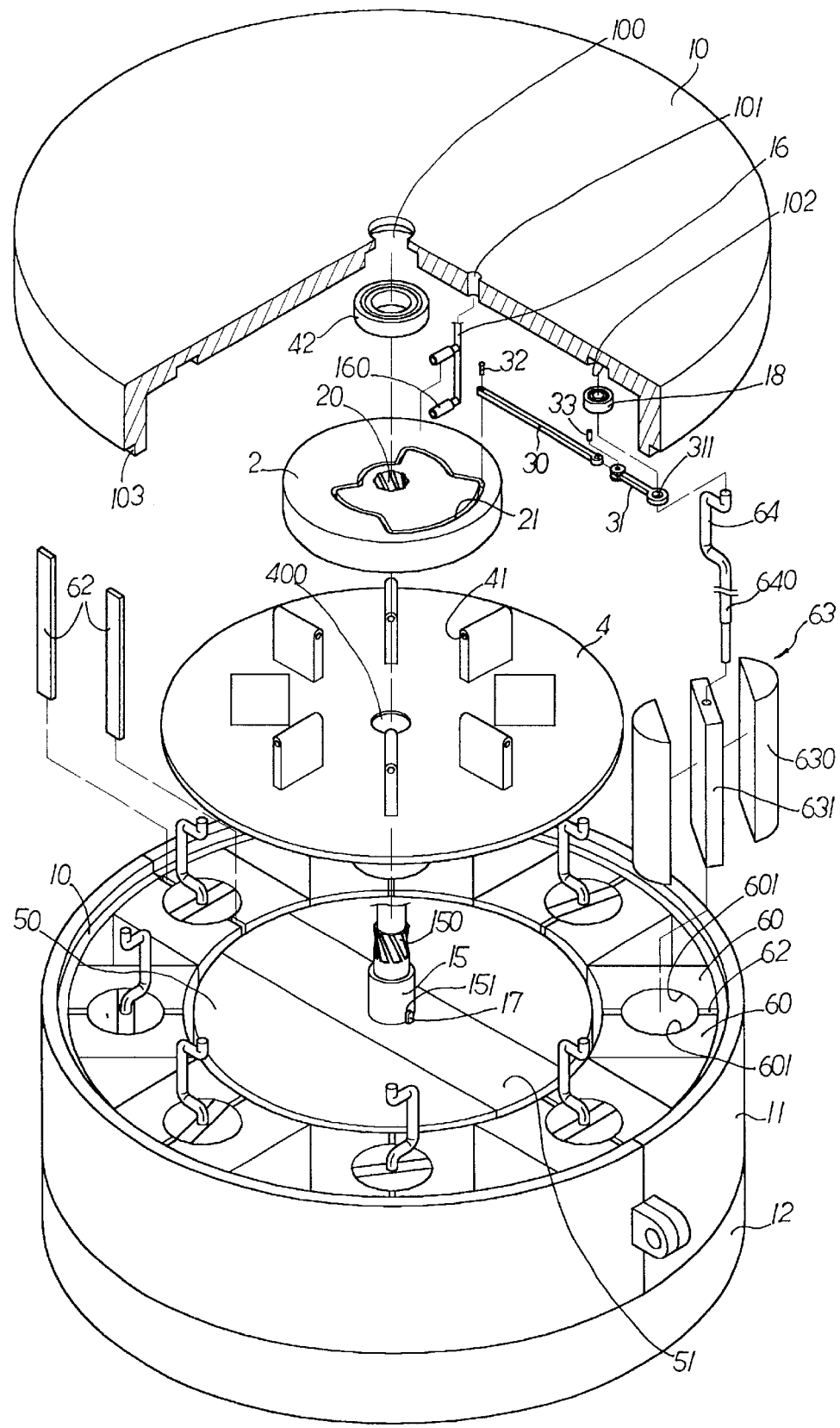
FIG. 1 is an exploded view to show a top section of the rotary device of the present invention.
Figure 3:
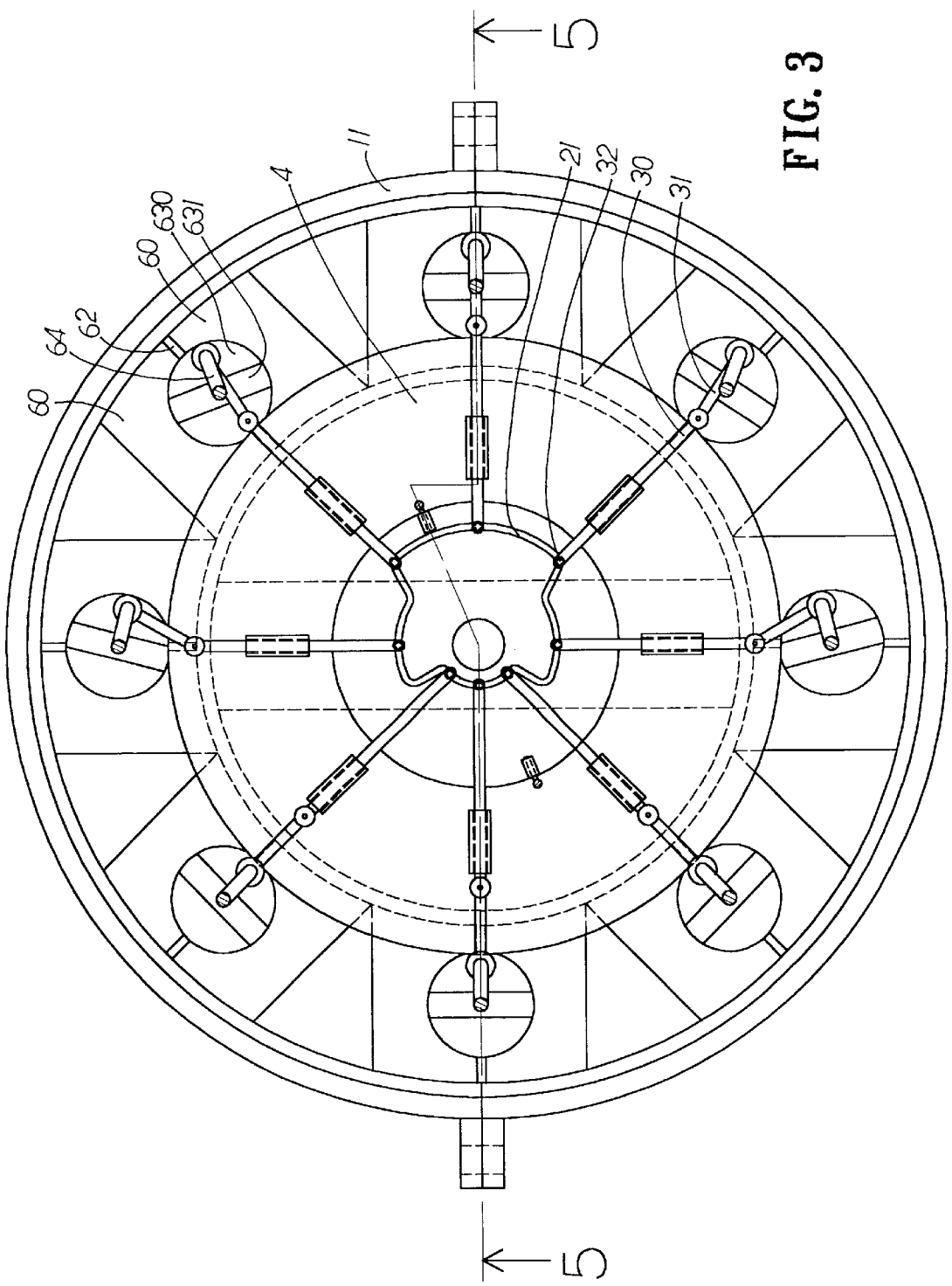
FIG. 3 is a top view to show the rotary device of the present invention.
Figure 4:
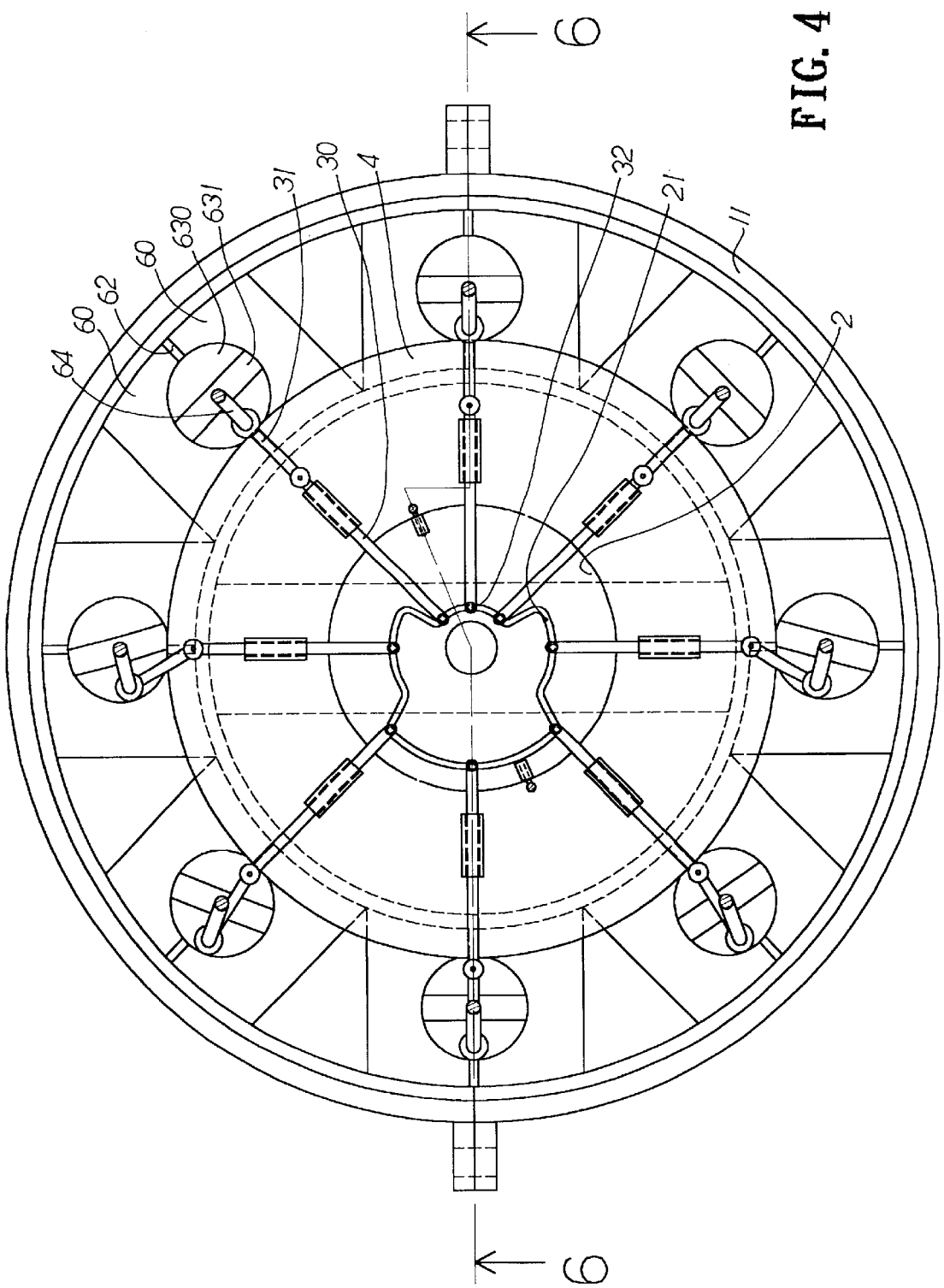
FIG. 4 is a top view to show the rotary device of the present invention wherein the output shaft is rotated an angle.
Figure 5:
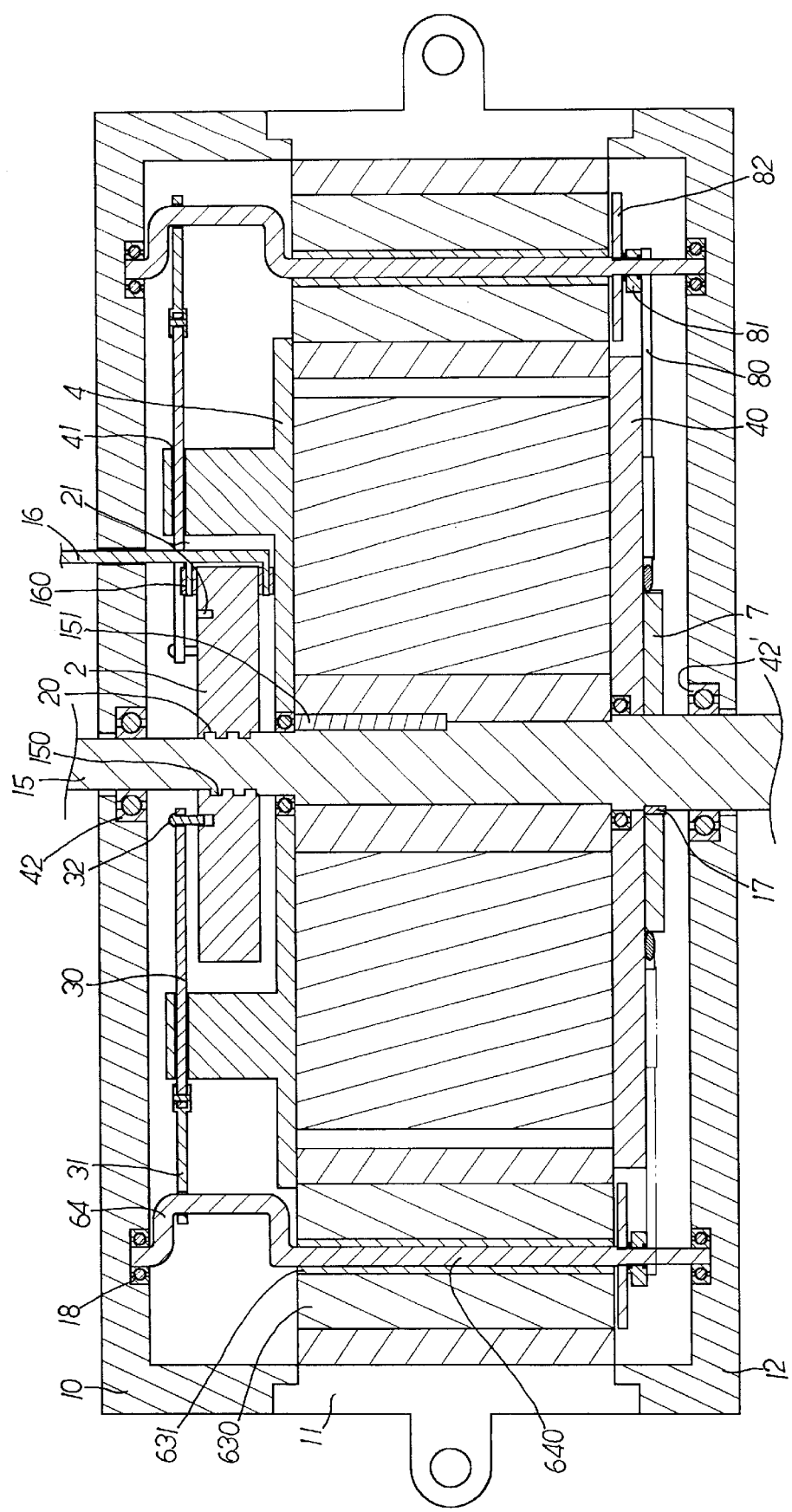
FIG. 5 is a sectional view to show the rotary device along the cutting line in FIG. 3.
Figure 6:
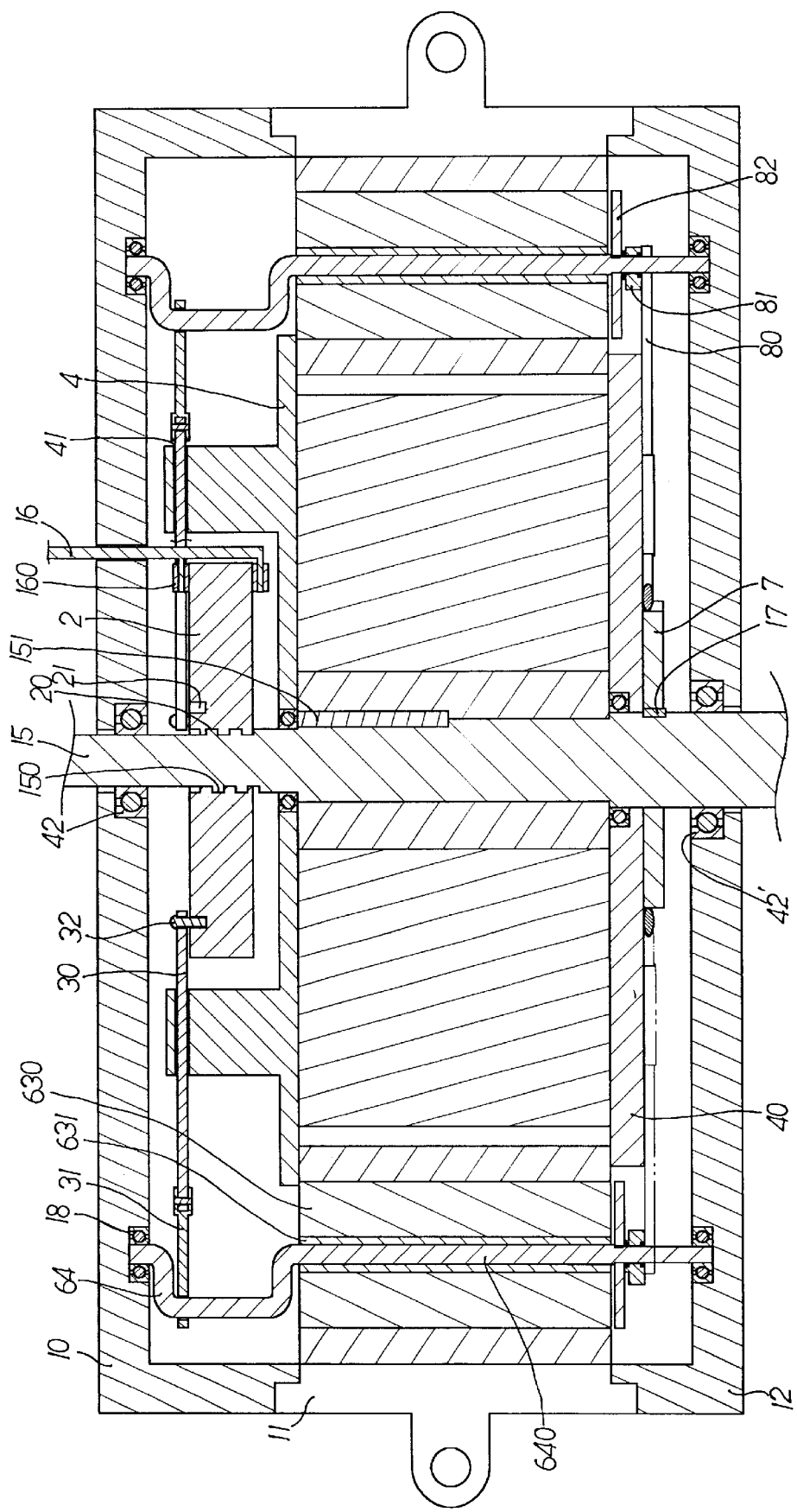
FIG. 6 is a sectional view to show the rotary device along the cutting line in FIG. 4.
Figure 7:
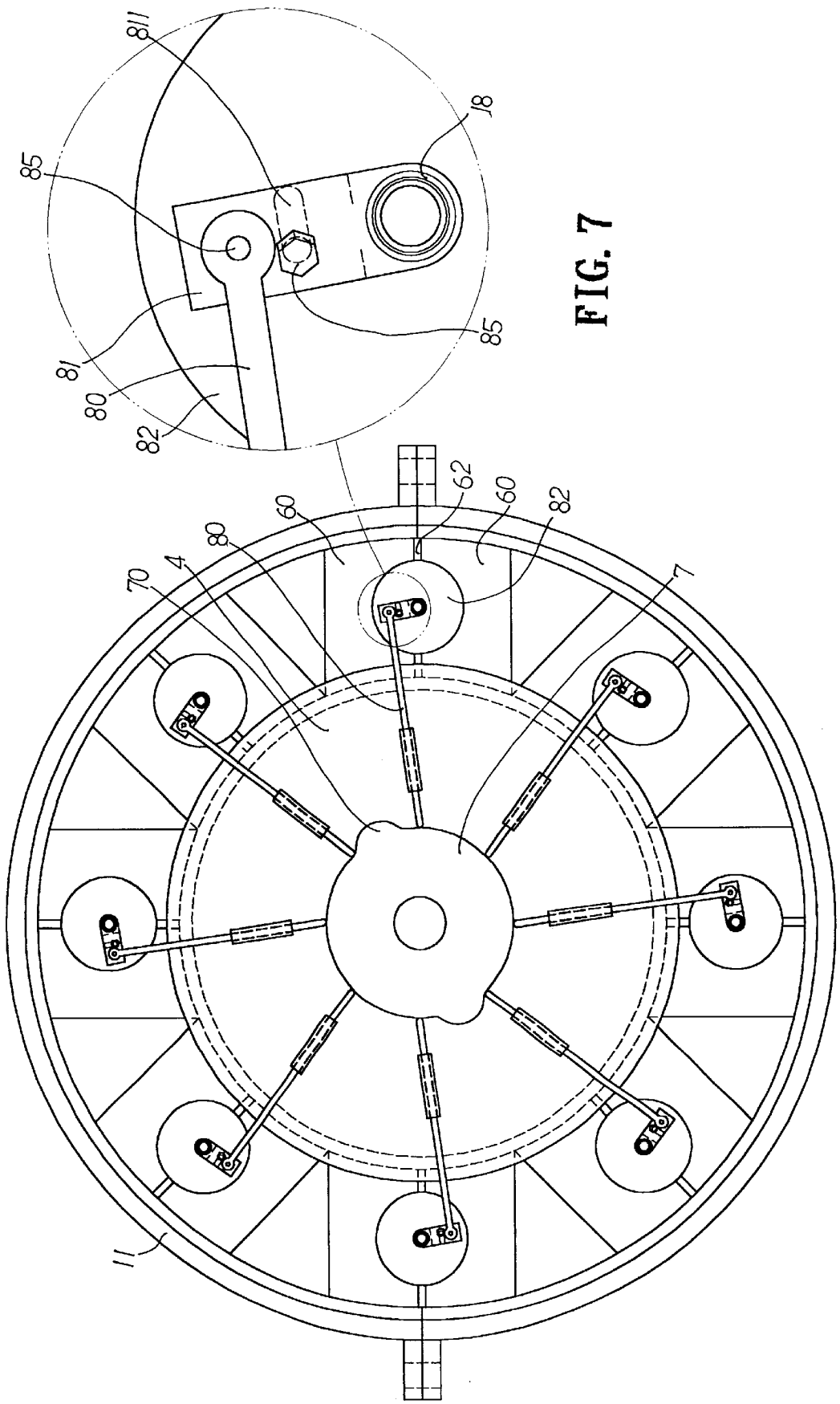
FIG. 7 is a bottom view to show the rotary device of the present invention.
Figure 8:
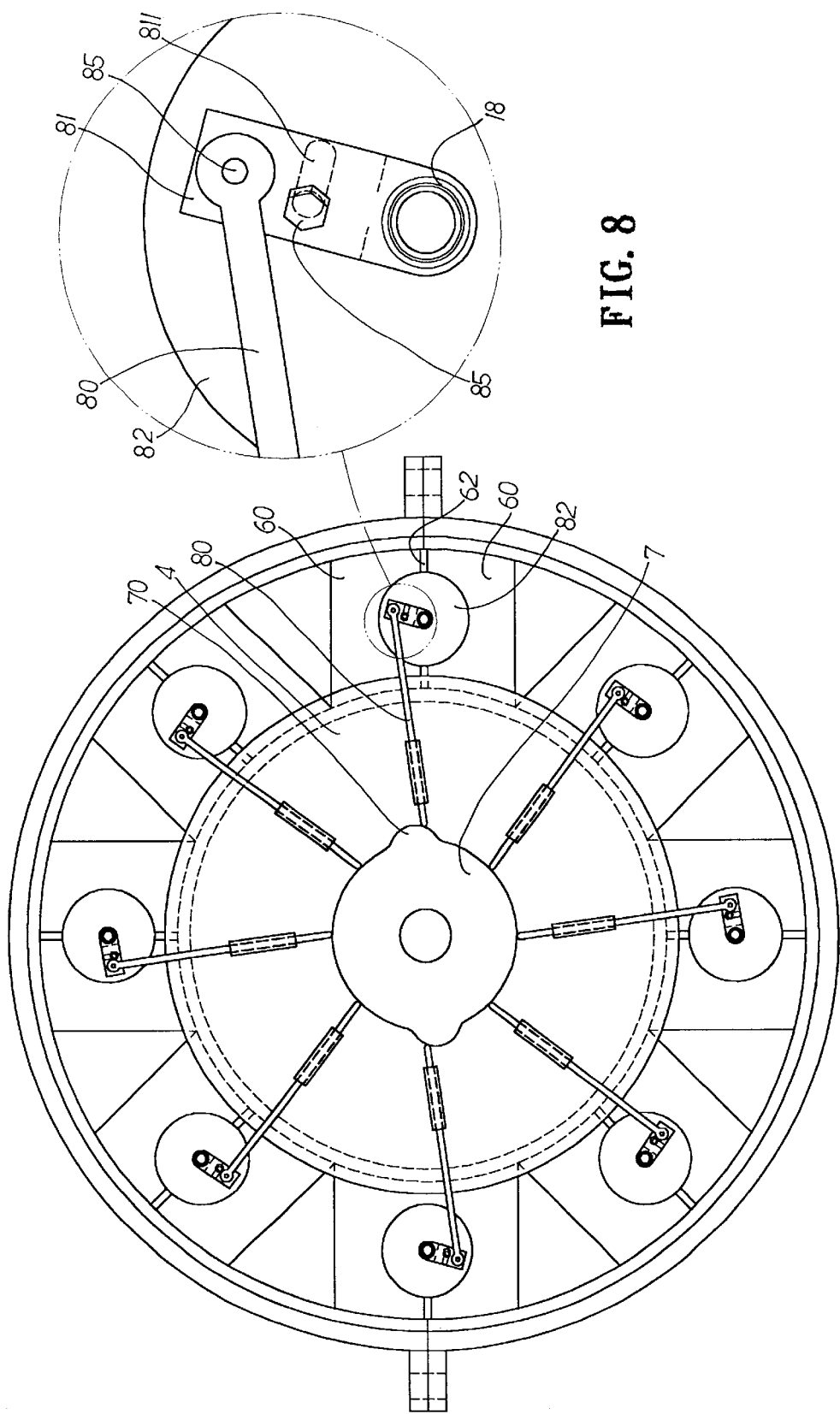
FIG. 8 is a bottom view to show the rotary device of the present invention wherein the output shaft is rotated an angle.

Referring to FIGS. 1, 3 and 5, the rotary device of the present invention comprises a rotator which is a sandwich structure and composed of a first member 51 made of magnetic permeable material and two second members 50 made of magnetic un-permeable material. An output shaft 15 securely extends through the first member 51 by a key 17 inserted in a key-way 151 defined in an outer periphery of the output shaft 15. The first member 51 is clamped between the two second members 50 and the output shaft 15 has bevel teeth 150 defined in an outer periphery thereof The rotator is enclosed by a ring retained by a collar 11 and composed of multiple sets of sections. Each section includes a sandwich structure and has a cylindrical assembly 63 rotatably retained in the sandwich structure which is composed of two side members 60 made of magnetic permeable material and two mediate members 62 made of magnetic un-permeable material clamped between the two side members 60. Each of the side members 60 has a semi-circular recess 601 so as to receive the cylindrical assembly 63. Each cylindrical assembly 63 comprises a center member 631 made of magnetic permeable material sandwiched by two outer member 630 made of magnetic un-permeable material. A rod 640 extends through the center member 631 of each cylindrical assembly 63 and a first end of the rod 640 has a crank 64.

A first fixed disk 4 has a hole 400 through which the output shaft 15 extends and a plurality of protrusions extending from a side of the fixed disk 4. Each protrusion has a first passage 41 defined radially therein. An activation disk 2 has a passage 20 which has bevel teeth defined in an inner periphery thereof and the bevel teeth are engaged with the bevel teeth 150 of the output shaft 15. An enclosed path 21 is defined in a surface of the activation disk 2. A plurality of first link 30 movably extend through the first passages 41 and a pin 32 is connected to each of the first links 30 wherein the pins 32 are movably engaged with the path 21 in the activation disk 2. Each of the first link 30 is pivotally connected a second link 31 by a pin 33 and a distal end of each second link 31 is connected to one of the cranks 64.

A first cover 10 has an engaging periphery 103 which is engaged with an engaging periphery 110 of the collar 11. A central hole 100 is defined through the first cover 10 and a bearing 42 is engaged with the central hole 100 so that the output shaft 15 extends through the bearing 42. A claw 16 has two rollers 160 which are respectively located on two sides of the activation disk 2. The shank of the claw 16 movably extends through a hole 101 in the first cover 10. A plurality of recesses 102 are defined in an inside of the first cover 10 and each recess 102 has a bearing 18 received therein so that an end of each crank 64 is engaged with the bearing 18.

Figure 2:
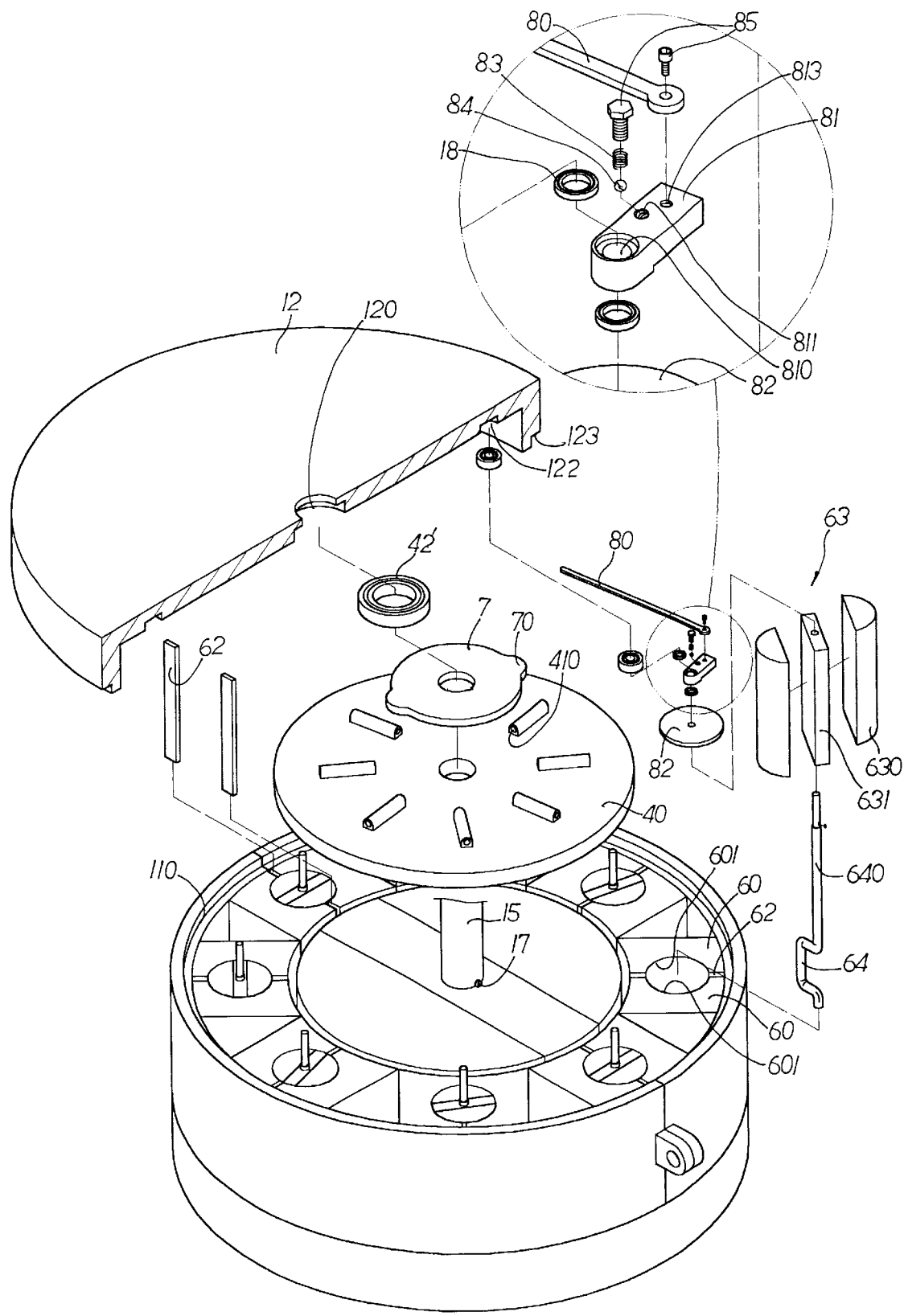
FIG. 2 is an exploded view to show a bottom section of the rotary device of the present invention.

Referring to FIGS. 2 and 5, a second fixed disk 40 is mounted to the output shaft 15 on the other side of the rotator and a plurality of second passages 410 are defined radially in the second fixed disk 40. Each second passage 410 has a push rod 80 movably inserted therethrough. A cam member 7 is mounted to the output shaft 15 and a first end of each of the push rods 80 contacts a periphery of the cam member 7 so that the push rods 80 are pushed by protrusions 70 of the cam member 7. A second end of each push of the rods 80 is connected to an end of a block 81 by extending a bolt 85 through the push rod 80 and engaged with a threaded hole 813 in the block 81. The other end of the block 81 has a hole 810 in which two bearings 18 are engaged, a second end of one of the rods 640 is engaged with the two bearings 18. A plate 82 is connected between each of the blocks 61 and each of the cylindrical assemblies 63. Further referring to FIGS. 9 and 10, an inclined threaded hole 811 is defined through each of the blocks 81 and a ball 84 and a spring 83 are respectively received in each of the inclined threaded hole 811. The ball 84 are biased by the spring 83 and contacting the plate 82. A second cover 12 has an engaging periphery 123 which is engaged with an engaging periphery 110 on the other end of the collar 11. A central hole 120 is defined through the second cover 12 and a bearing 42' is engaged with the central hole 120 and the output shaft 15 extends through the bearing 42'. A plurality of recesses 122 are defined in an inside of the second cover 12 and each recess 122 has a bearing 18 received therein so that the second end of each rod 64 is engaged with the bearing.

Referring to FIGS. 3 to 8, an initial force is used to push the claw 16 to let the activation disk 2 move toward the ring, the shaft 15 is rotated an angle because the bevel teeth 150 on the shaft 15 are engaged with the bevel teeth in the passage 20. The rotor is rotated with the shaft 15 and further attracted by the center member 631 made of magnetic permeable material in each of the cylindrical assemblies 63 so that the rotor will be rotated to a further angle. The rotation of the shaft 15 makes the activation disk 2 rotate and the first links 30 and the second links 31 are moved according to the movement of the pin 32 in the path 21 of the activation disk 2. This makes each of the cylindrical assemblies 63 rotate and the rotation of the cylindrical assemblies 63 rotates the rotor together with the shaft 15. The rotation of the shaft 15 makes the activation disk 2 rotate and again to move the links 30 and 31 to rotate the cylindrical assemblies 63. Therefore, the rotor and the shaft 15 rotate continuously.

The cam member 7 is secured to the shaft 15 so that it rotates to push the push rods 90. When the blocks 81 rotate, the balls 84 are pushed to compress the springs 83 and roll on the plates 82 as shown in FIG. 9. When the push rods 80 rotate the blocks 81 to rotate in a reverse direction, the angle between the inclined threaded hole 811 and the plate 82 is become small and which urge the ball 84 between the block 81 and the plate 82 so that the plate 82 and the block 81 are rotated in the same direction to rotate the rod 640. This can prevent any dead angle between the first link 30 and the second link 31 and ensure the rod 64 will always rotate.

The device uses the magnetic force to let the output shaft 15 rotate continuously without adding extra energy thereto so as to have a high efficient operation.

While we have shown and described various embodiments in accordance with the present invention, it should be clear to those skilled in the art that further embodiments may be made without departing from the scope and spirit of the present invention.

What is claimed is:

1. A rotary device by using magnetic force, comprising:

a rotator composed of a first member made of magnetic permeable material and two second members made of magnetic un-permeable material, an output shaft securely extending through said first member and said first member clamped between said two second members, said output shaft having bevel teeth defined in an outer periphery thereof;

said rotator enclosed by a ring composed of multiple sets of sections, each section having a cylindrical assembly rotatably retained between two side members made of magnetic permeable material, two mediate members made of magnetic un-permeable material clamped between said two side members, each cylindrical assembly comprising a center member made of magnetic permeable material sandwiched by two outer member made of magnetic un-permeable material, a rod extending through said center member of each cylindrical assembly, a first end of said rod having a crank;

a first fixed disk having a hole through which said output shaft extends and a plurality of first passages defined radially in said first fixed disk, an activation disk having a passage which has bevel teeth defined in an inner periphery thereof and engaged with said bevel teeth of said output shaft, a path defined in a surface of said activation disk, a plurality of first links movably extending through said first passages and a pin connected to each of said first links, said pins movably engaged with said path in said activation disk, each of said first link pivotally connected a second link which is connected to one of said cranks, and a second fixed disk mounted to said output shaft on the other side of said rotator, a plurality of second passages defined radially in said second fixed disk and each second passage having a push rod movably inserted therethrough, a cam member mounted to said output shaft and a first end of each of said push rods contacting a periphery of said cam member, a second end of each push rods connected to an end of a block and the other end of said block pivotally connected to a second end of one of said rods.

2. The device as claimed in claim 1 further comprising a claw having two rollers and said activation disk being clamped between said two rollers.

3. The device as claimed in claim 1 further comprising a plate connected between each of said blocks and each of said cylindrical assemblies, an inclined threaded hole defined through each of said blocks and a ball and a spring respectively received in each of said inclined threaded hole, said ball biased by said spring and contacting said plate.

4. The device as claimed in claim 1 further comprising a collar enclosing said ring and a first cover and a second cover respectively mounted to two ends of said collar, said claw movably extending through said first cover, said output shaft rotatably extending through said first cover and said second cover.

* * * * *